United States Patent [19]
Maylon

[11] Patent Number: 5,697,195
[45] Date of Patent: Dec. 16, 1997

[54] PLASTER SECURITY BARRIER SYSTEM

[75] Inventor: Gary Joseph Maylon, Trussville, Ala.

[73] Assignee: Alabama Metal Industries Corporation, Birmingham, Ala.

[21] Appl. No.: 399,566

[22] Filed: Mar. 7, 1995

[51] Int. Cl.$^6$ .................. B32B 7/00; E04B 9/00
[52] U.S. Cl. .................. 52/344; 52/343; 52/446; 52/454; 52/506.06; 52/670
[58] Field of Search .................. 52/344, 342, 343, 52/454, 445, 446, 506.06, 670, 506.07, 506.08; 206/388; 220/4.24

[56] References Cited

U.S. PATENT DOCUMENTS

| | | | |
|---|---|---|---|
| 1,172,085 | 2/1916 | Weakley | 52/445 |
| 1,210,849 | 1/1917 | Scammell | 52/670 X |
| 1,499,408 | 7/1924 | Scammell | 52/446 |
| 1,510,233 | 9/1924 | McFardland | 52/446 |
| 1,569,144 | 1/1926 | Scammell | 52/344 X |
| 1,677,073 | 7/1928 | Cohen | 52/454 X |
| 1,967,905 | 7/1934 | Roos | 52/454 X |
| 1,976,395 | 10/1934 | Herbest, Jr. | 52/670 X |
| 2,020,908 | 11/1935 | Scammell | 52/446 X |
| 2,034,726 | 3/1936 | Menninger | 52/454 X |
| 2,098,261 | 11/1937 | Spinosa | 52/343 |
| 2,104,870 | 1/1938 | Levy | 52/264 |
| 2,130,372 | 9/1938 | Tucker | 52/344 X |
| 2,355,333 | 8/1944 | Sandell | 52/446 X |
| 2,474,778 | 6/1949 | Cross | 52/454 |
| 3,308,591 | 3/1967 | Goldsworthy | 52/343 X |
| 3,559,355 | 2/1971 | Day, Jr. | 52/251 |
| 3,638,382 | 2/1972 | Merrill | 52/359 |
| 3,736,205 | 5/1973 | Sullivan | 52/454 X |
| 3,842,561 | 10/1974 | Wong | 52/506.07 |
| 4,062,160 | 12/1977 | Christison | 52/445 |
| 4,107,372 | 8/1978 | Clausen et al. | 428/256 |
| 4,525,965 | 7/1985 | Woelfel | 52/309.17 |
| 4,798,032 | 1/1989 | Rose, Jr. | 52/81.4 |
| 4,947,607 | 8/1990 | Stein | 52/506.06 |
| 5,048,257 | 9/1991 | Luedtke | 52/747.1 |
| 5,129,628 | 7/1992 | Vesper | 256/31 |

FOREIGN PATENT DOCUMENTS

| | | | |
|---|---|---|---|
| 1126628 | 11/1956 | France | 52/506.06 |
| 2339284 | 2/1974 | Germany | 52/506.06 |

OTHER PUBLICATIONS

Construction Dimensions, "Lath and Plaster Detention and Security Walls", Jan. 1991, pp. 36–38 and 40–42.
Keene Products, "Barrier Mesh" on p. 3, 1994 Sweets General Building & Renovation Catalog.
Amico, "Security Mesh", 4 pages, 1994 Sweets General Building & Renovation Catalog.
Amico, "Metal Lath & Accessories", 1995 Sweets General Building & Renovation Catalog.

Primary Examiner—Carl D. Friedman
Assistant Examiner—Laura A. Saladino
Attorney, Agent, or Firm—Trexler, Bushnell, Giangiorgi & Blackstone, Ltd.

[57] ABSTRACT

A security barrier system which includes a security lath assembly having a layer of mesh material and a backing material attached thereto. The mesh material is of a gauge and configuration to provide a security barrier. The security barrier system includes application of plaster or stucco directly to the security lath assembly. A surface coating is applied to the plaster layer to prevent the formation and propagation of cracks through the surface. Also included in the barrier system is an uplift control mechanism and expansion and contraction elements which prevent a ceiling structure from being displaced and accommodates structural expansion and contraction.

5 Claims, 3 Drawing Sheets

PLASTER SECURITY BARRIER SYSTEM

BACKGROUND

The present invention relates to a security barrier system for use in the construction of plaster type structures. Further, the present invention relates to a security lath assembly for use in constructing security barriers as part of a plaster type structure.

Security barrier systems are useful and, in fact, often required in applications where a security barrier must be integrated into the structure of a building to prevent entry or escape through walls or ceilings. For example, security barriers are required in many detention and incarceration facilities as well as portions of courtrooms, financial institutions and hospitals. Corporate facilities may also require such a security barrier system for areas which require a higher level of security. The foregoing list is merely a sampling of a variety of uses in which security barrier systems are needed. Numerous other applications for such systems are presently in use and will be developed as the need arises. Prior art security barrier systems have provided a degree of security by incorporating an individual security layer into the construction of structures such as ceilings and walls.

Prior art security barrier systems, while providing a degree of security, require substantial additional labor and material thereby increasing the time, cost and complications involved in the construction of structures using security barrier systems. For example, prior art security barrier systems included using expanded metal mesh underneath a plaster wall construction. Typically, the plaster wall construction would be framed with the structural components such as framing or masonry structures and the expanded metal security barrier mesh would be applied over the structural elements. Next, a lighter weight metal mesh would be attached over the expanded metal security barrier mesh. The lighter metal mesh would be used in the plastering process to form the plastered wall or ceiling surface.

Clearly, this construction technique requires multiple operations in order to provide the resultant security effect. This construction technique requires first, the cutting and attachment of the expanded metal security barrier mesh and then the sizing and attachment of the lath to the security metal mesh. It should be clear that these steps appear to be duplicative. Also, this technique allows for numerous errors to occur as a result of involving multiple constructions steps.

Attempts have been made to eliminate the multiple steps by providing a metal lath to use in the construction of the plastered surface which also provides the security barrier benefits of the heavy gauge security barrier mesh. However, it has been found that the heavy gauge metal mesh did not function properly in the intended application due to a number of unexpected problems. The heavy gauge security barrier mesh typically has a larger expansion aperture or cell formed therein. The larger cell is inappropriate for appropriate keying of plaster in the construction of plaster structures. The layer cell size allows too much plaster to pass through the mesh resulting in a plaster layer which is heavier than necessary making the structure heavier which in turn promotes material fatigue and cracking.

When a lighter gauge expanded metal mesh is used as plaster lath, the expansion apertures are often small and closely spaced. The smaller, more frequent openings in the mesh provide a preferred degree of keying of plaster to the mesh. It is important to provide a sufficient degree of keying without overapplying plasters in the mesh so that a consistent plaster layer may be applied to the mesh. A consistent plaster layer results in predictable, generally even curing or drying of the plaster which prevents cracking and other fatigue problems. Additionally, a predictable generally even layer of plaster allows designers to provide appropriate structural support for the plaster surface such as wall framing and ceiling supports. With the larger gauge security mesh, the inconsistent plaster layer may result in sagging of the structure which, once again can result in uneven plaster surfaces and structural irregularities such as cracks.

Use of the heavier gauge expanded metal security mesh also produces problems as a result of the thermal expansion and contraction of the mesh material and heavy plaster layer. When the heavy security barrier mesh was used with an overlying plastering lath, thermal expansion and contraction effects were reduced since plaster generally was not keyed to the security barrier mesh to the same extent. As a result, the plaster layer was thinner and not subject to the same range of expansion and contraction. The use of the plastering lath over the security barrier mesh, as noted above, produced a generally consistent plaster layer which encountered only minor thermal expansion and contraction effects due to the lighter gauge plastering lath. When the security barrier mesh was used as the primary plastering lath, the plaster layer became inconsistent and prone to the more extreme expansion and contraction of the heavy security mesh. As a result, such structures tended to have cracking problem requiring repairs during the construction phase as well as numerous maintenance repairs.

As a further element of the problem encountered with prior art security barrier systems, the security barriers must meet numerous construction codes or rules as well as requirements pertaining to the specific type of facility in which the barrier is used. For example, there are numerous construction codes which apply to prisons and other incarceration facilities while other, more strict or less strict codes may apply to other situations. As such, it would be highly desirable to provide a security barrier system which can meet numerous code requirements while eliminating additional construction steps and materials and provide a high quality finished plaster surface which requires minimal construction and maintenance repair. Heretofore, it is not believed that a security barrier system has been devised to satisfy the broad range of security and construction requirements.

OBJECTS AND SUMMARY

A general object satisfied by the present invention is to provide a security barrier system which includes a security lath assembly which is uncomplicated in its construction and satisfies a broad range of construction and security requirements.

Another object satisfied by the present invention is a security lath assembly for use in a security barrier system of the present invention, which security lath assembly satisfies numerous security and construction constraints.

Still a further object satisfied by the present invention is a security lath assembly for use in a security barrier system which may be employed in ceiling structures to provide security yet resists material fatigue.

Briefly, and in accordance with the foregoing, the present invention envisions a security barrier system which includes a security lath assembly having a layer of mesh material and a backing material attached thereto. The mesh material is of a gauge and configuration to provide a security barrier. The security barrier system includes application of plaster or stucco directly to the security lath assembly. A surface coating is applied to the plaster layer to prevent the formation and cracking propagation of cracks through the surface. Also included in the barrier system is an uplift control mechanism and expansion and contraction elements which prevent a ceiling structure from being displaced and accommodates structural expansion and contraction.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
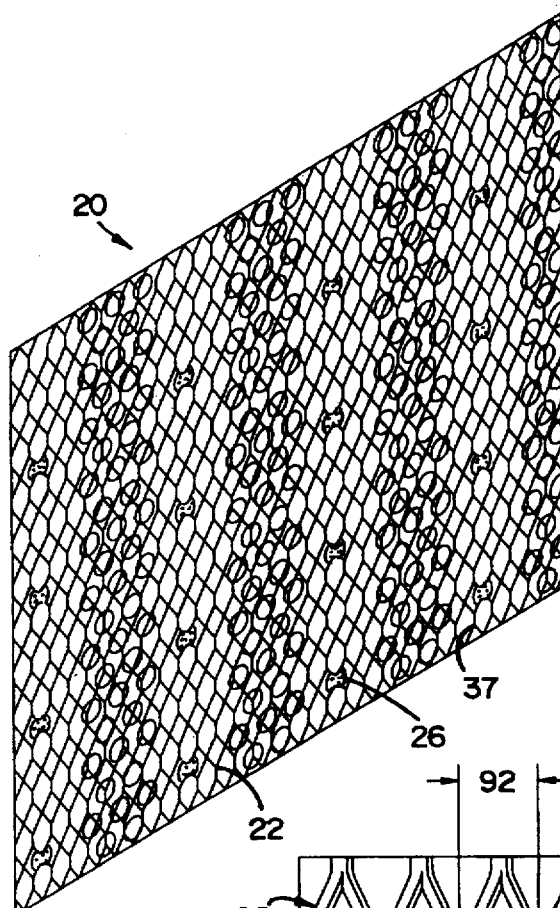
FIG. 1 is a perspective view of a security lath assembly of the present invention as used in a security barrier system of the present invention.

While the invention may be susceptible to embodiments in different forms, there is shown in the drawings, and herein will be described in detail, an embodiment with the understanding that the present description is to be considered an exemplification of the principles of the invention and is not intended to limit the invention to that as illustrated and described herein.

Figure 2:
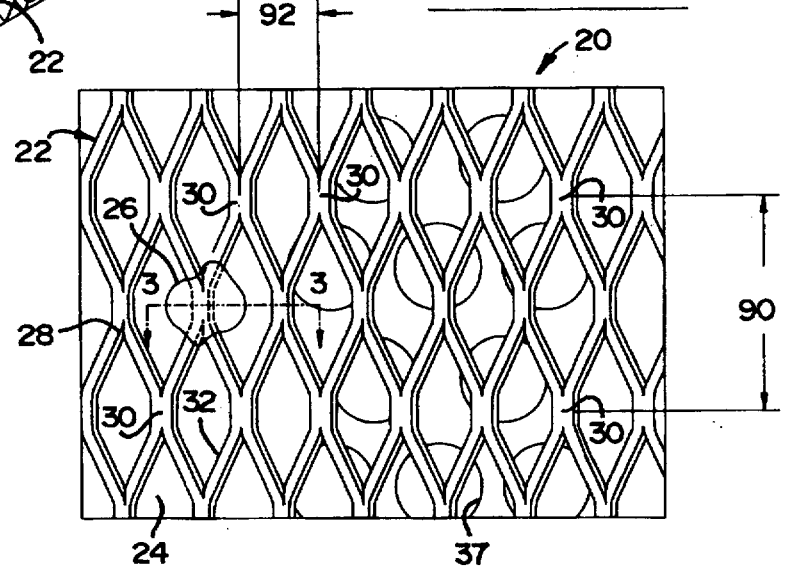
FIG. 2 is an enlarged, front elevational view of a portion of the security lath assembly illustrated in FIG. 1 showing a mesh material attached to a backing material.
Figure 3:
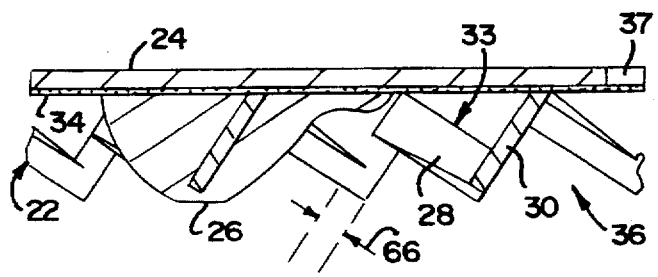
FIG. 3 is an enlarged, cross-sectional, top plan view taken along line 3—3 in FIG. 2 showing a portion of the mesh material attached to the backing material and an adhesive used to attach the mesh material to the backing material.

With reference to FIGS. 1-3, a security lath assembly 20 is shown in a perspective view, an enlarged front elevational view and a greatly enlarged cross-sectional view. The dimensions as shown in FIG. 3 may be exaggerate in order to more clearly show the structure of the security lath assembly 20. The security lath assembly 20 includes a mesh material 22 and a backing material 24 to which the mesh material 22 is attached by attaching means 26. The security lath assembly 20 defines a generally planar sheet assembly which may be employed in plaster or stucco structures in which plaster or stucco is directly applied to the security lath assembly.

A security barrier system 29 of the present invention (See, FIGS. 4 and 5 generally) employs the security lath 20 of the present invention. As will be described in greater detail below, the security lath assembly 20 is attached to a frame structure 34 and a plaster or stucco material 35 is applied over the security lath to define a structure. The security lath 20 provides a plaster keying function as well as a security barrier to prevent penetration through the security barrier system 29.

Figure 4:
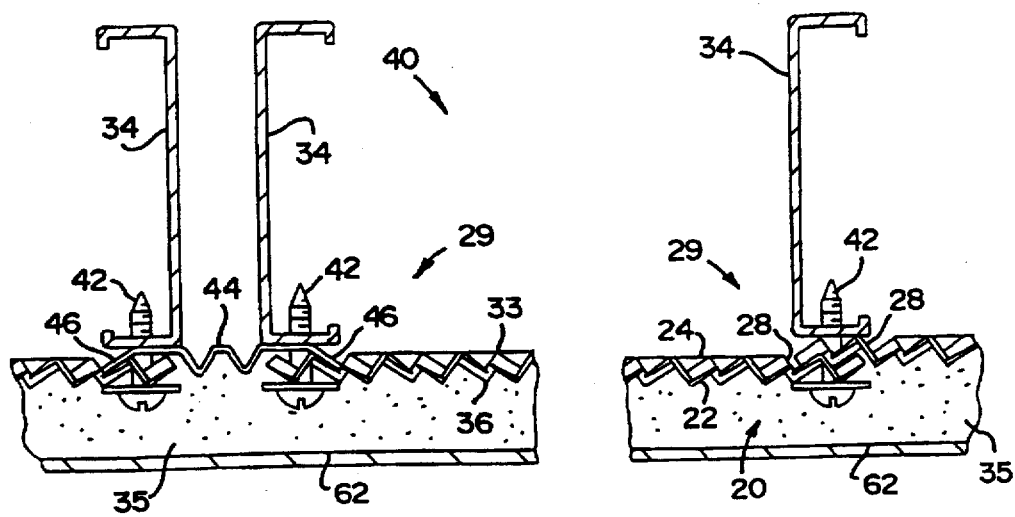
FIG. 4 is a partial fragmentary, cross-sectional, top plan view of a security barrier system employing the security lath assembly in a wall structure.
Figure 5:
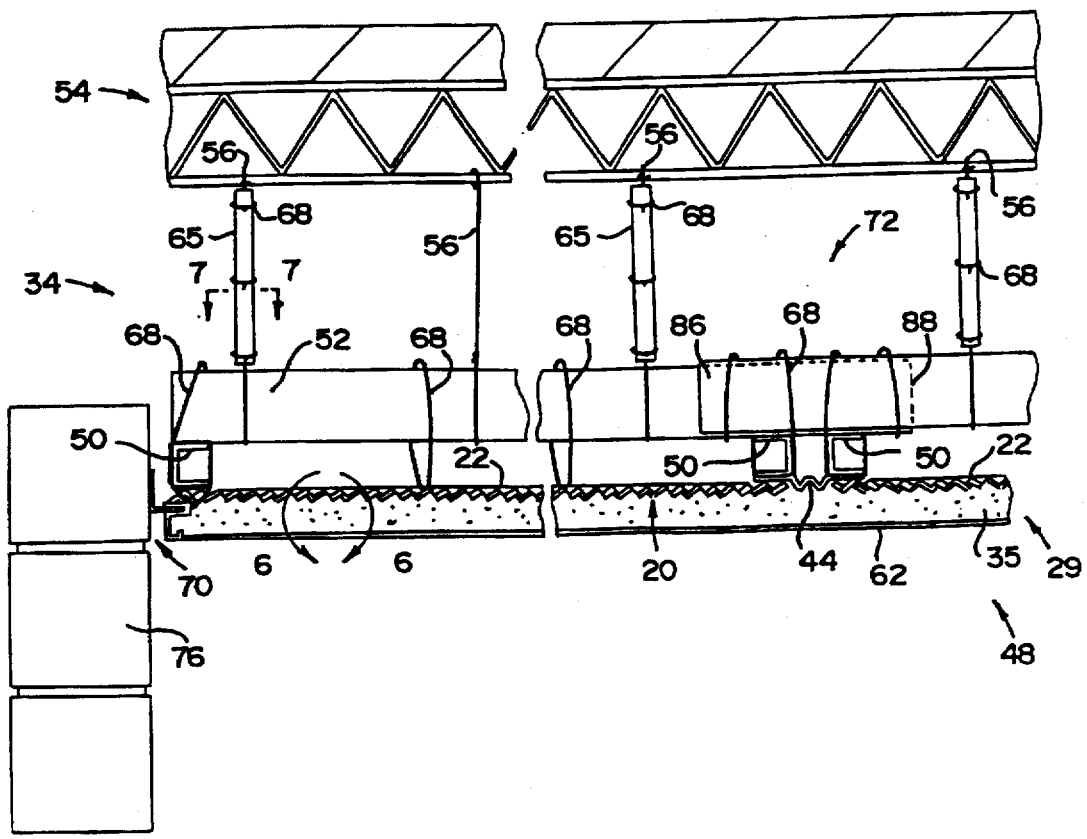
FIG. 5 is a partial fragmentary, cross-sectional, side elevational view of the security barrier system of the present invention employing the security lath assembly of the present invention in a ceiling structure.
Figure 6:
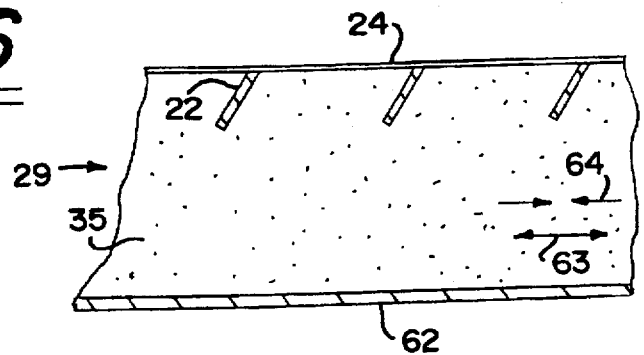
FIG. 6 is an enlarged, partial fragmentary, cross-sectional, side elevational view taken along line 6—6 in FIG. 5 showing how a surface coating helps to prevent the development and propagation of cracks through a plaster material of the barrier system.

With reference to FIGS. 1-3, the mesh material 22 is illustrated as having a plurality of stakes 28 which are integrally connected by bonds 30. Neighboring stakes periodically connect at the bonds 30 defining an opening area or cell 32 therebetween. FIGS. 3, 4 and 5 show mesh material 22 which has a staggered or zigzag cross-sectional appearance. This form is of mesh achieved as a result of die forming the mesh material 22 from a continuous piece of sheet material. The mesh is coated with an appropriate coating to prevent corrosion. While a die formed metallic mesh 22 is shown herein, it should be clear that other materials may be used to form the mesh material as long as the material provides sufficient security characteristics to prevent penetration through the constructed security barrier structure.

A generally sheet-like material is used for the backing material 24 which is attached to the back side 33 of the mesh material 2; the side which is secured to the frame means or structure 34 (See FIGS. 4 and 5). Attachment of the backing material 24 to the mesh 22 provides a boundary for limiting material movement through the cells 32 of the mesh material 22 and is used to affect the curing rate of the plaster keyed to the mesh 22. A number of apertures 37 are formed through the backing material 24. These apertures are sized and configured to allow a craftsman to see through the security lath assembly 20 during installation without adversely affecting the cure rate. The aperture 37 permit sighting of structures 34 behind the backing material 24 for attachment of the security lath assembly 20 thereto. Further details regarding the construction of the security barrier system 29 are provided herein below.

As more clearly shown in FIG. 3, a coating 34 such as a polymer substance is applied to the backing material for affecting the curing rate of the plaster material 35 applied to the security lath assembly 20. It should be noted that a backing material 24 may be selected such that a coating 34 is not necessary. For example, if the backing material 24 is a material which affects the curing rate of the plaster, a coating 34 may not be necessary. On the other hand, if a relatively inexpensive plentiful backing material 24 such as paper or other fibrous sheet material is employed, it may be advantageous to apply a coating 34 to the paper to slow the curing rate of the plaster. Additionally, the coating 34 will prevent degradation of backing materials 24 such as paper or other fibrous sheet materials which may be adversely affected by moisture during the curing process. By affecting the curing rate, the resultant plaster surface will cure more evenly thereby preventing or reducing the incidence of cracking which may otherwise result in an uncontrolled curing environment.

As shown in FIGS. 1-3, the attaching means 26 is shown as an adhesive material which quickly, easily and inexpensively bonds or adheres to both the mesh material 22 and the backing material 24. If the mesh material 22 and the backing material 24 have coatings, the adhesive 26 is selected so as to be compatible with both of these surfaces. During the assembly of the security lath assembly 20, the mesh material 22 is placed on top of the backing material 24 in a generally horizontal orientation. A quantity of adhesive 26 is applied to a face side 36 of the mesh material 22 opposite the backing material 24. The adhesive extends over a portion of the mesh material 22 and through the corresponding portions of the cells 32 and onto the abutting surface of the backing material 24. The adhesive 26 forms a connection between the mesh material and the backing material for retaining the mesh material 22 in attachment with the backing material 24. In FIG. 2, the adhesive 26 is shown extending over a portion of a bond 30. It should be clear that the adhesive could also be applied over a portion of a stake 28 and not come in contact with the bonds 30. The important point to understand is that the adhesive 26 extends over the mesh material 22 and contacts the backing material 24. With reference to FIG. 1, adhesive 26 has been applied in a pattern so as to produce a generally uniform attachment between the mesh material 22 and the backing material 24.

Turning now to the description of the overall plaster security barrier system 29 employing the security lath assembly 20 of the present invention as further shown in FIGS. 4–8. In FIG. 4, the security lath assembly 20 is attached to a frame 34 to construct a generally vertically wall structure 40. The wall structure 40 includes the security lath assembly 20 which may be directly attached to the frame means 34 or studs by way of fasteners 42.

When sections of the security lath assembly 20 meet, it is desirable to overlap the neighboring sections. This assembling technique can be seen in the right-hand side of FIG. 4 in which two neighboring sections of the security lath assembly 20 are overlapped with the stakes 28 nesting one over the other. The fastener 42 extends through overlapping cells 32 and into the framing stud 34. It should be noted, that the backing material 24 has been removed from the overlying portion of the security lath assembly 20 (left-hand portion of the overlapping material) so that the overlying portion cleanly nests with the underlying portion.

An expansion joint 44 is provided as may be required between two framing studs 34,34 (See the left-hand side of FIG. 4). Portions of the lath assembly 20 are positioned overlying the expansion joint 44 with a fastener 42 extending through a corresponding cell 32, through an outboard flange 46 of the expansion joint 44 and into the framing stud 34.

The framing studs 34 as described herein may be metallic, wood or any other appropriate construction material for this type of application. Additionally, the studs need not be vertically oriented, rather, they may be angled at an appropriate angle configured to form a complex surface or, employed in a generally horizontal fashion. When the security lath assembly 20 of the present invention is employed in the security barrier system 29, also of the present invention, in a ceiling application, additional considerations may have to be taken into account. However, the construction as shown in FIG. 4 may be used for ceiling application where deemed appropriate.

Turning now to FIGS. 5–8, it can be seen that the security lath assembly 20 of the present invention is employed in the plaster security barrier system 29 in a ceiling construction 48. The security lath assembly 20 is secured to frame means 34. The frame 34 means include channels 50 attached to cross members 52 which provide a grid-like support frame 34. The ceiling 48 shown in FIG. 5 is actually suspended from an upper support structure 54. A plurality of suspension means 56 are attached between the upper support structure 54 and the frame 34 to suspend the frame 34 from the upper support structure 54. Generally, the suspension means 56 are shown in the form of a wire or cable, commonly used in ceiling structures, is securely attached to both the upper support structure 54 and the frame means 34.

The plaster security barrier system 29 is provided by using the security lath assembly 20 of the present invention in combination with frame means 34, and the plaster material 35 and a surface coating 62. With the security lath assembly 20 attached to the frame means 34, the plaster material 35 is applied to the outwardly facing face side 36 of the mesh material 22 with a quantity of the plaster material 35 being keyed into the cells 32 of the mesh material 22. As noted above, the backing material 24 limits the extent of keying or provides a boarder to limit the movement of plaster through the cells 32. By eliminating the amount of plaster which moves through the cells 32 to the backside 33 of the mesh material 22, a more uniform finished surface may be achieved.

As can be seen in FIGS. 4, 5, 6 and 8, the mesh material 22 is embedded in the plaster material 35. Once the plaster material 35 has been applied to the mesh material 22, the plaster material drys at a controlled rate due to the coating 34 on the backing material 24, to produce a more consistent and desirable plaster structure. A final surface coating 62 is applied to the finished plaster surface to prevent the formation and propagation of cracks in the plaster material.

While the present invention produces a security barrier system 29 providing superior results compared to prior art systems, it has been found that it is desirable to also apply the surface coating 62. Plaster 35 and the underlying mesh material 22 tend to expand and contract (as shown by force arrows, expansion 63, and contraction 64) as the result of their thermal characteristics. This contraction and expansion cannot be eliminated from the system structure but the adverse effect can be controlled in order to prevent detrimental results. One way the present invention deals with the adverse effects of expansion (63) and contraction (64) is to apply the surface coating 62 over the finished plaster surface. The surface coating 62 is preferably a material which has elastomeric qualities which will expand (63) and contract (64) with the plaster material. In this way, the coating 62 will prevent the formation of cracks by preventing the separation of the surface of the plaster and will prevent the propagation should a crack form since it will span the opening of the crack.

Another important consideration of the present invention is the use of a mesh material 22 which provides required security characteristics yet is light enough to be used in a variety of construction applications. Further, it is important to provide a mesh material which is properly configured to receive plaster without requiring an additional layer of plaster lath to construct a plaster structure. In this regard, the present invention uses a metal mesh material which is formed by expanding a generally continuous sheet material to form the stakes 28 integrally connected by the bonds 30 defining the cells 32. More specifically, such metal mesh material is expanded from a generally continuous sheet of material of generally 18 to 13 gauge (as indicated by dimension 66). The material is expanded to have an open area of generally 40% to 90% and which material, when expanded results in a weight of generally 20–175 lbs. per 100 square feet.

More specifically, the preferred embodiment of the present invention employs an expanded metal mesh material formed from a generally continuous 16 gauge sheet material which is expanded to have an open area of generally 60%–90%, resulting in a weight of generally 40–100 lbs. per 100 square feet. The specific range, percentage of open space, and weight per area have been found to provide desirable security characteristics as well as allowing the security barrier to provide a lath function in the construction of plaster structures. These ranges of mesh characteristics also result in a mesh which has thermal characteristics which are conducive to the expansion and contraction of the assembled of the security barrier system 29 which minimizes cracking.

Having now described the structure and function of the security lath assembly 20, as used in both a wall 40 and a ceiling 48 structure, additional features of the security barrier system 29 when used in a ceiling structure 48 will be fully described hereinbelow.

With reference to FIG. 5, an uplift control 65 is employed with the suspension means 56 to prevent the planar plaster portion of security barrier system 29 from being displaced upwardly. This is an important feature in applications where security must be maintained to prevent penetration through ceiling structures 48. For example, in prisons or other detention type facilities, inmates may attempt to escape through ceiling spaces to exploit the nature of ceiling constructions which often have a space between a drop suspended portion of the ceiling and an upper structure. The uplift control 65 provides a rigid support between the frame 34 and the upper support structure 54 thereby preventing upward displacement.

Figure 7:
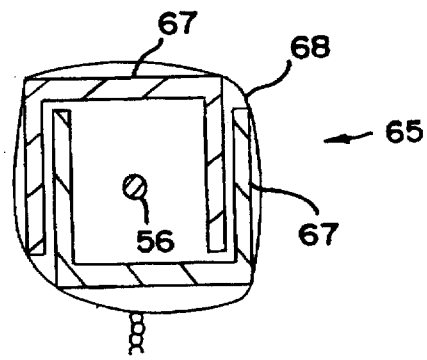
FIG. 7 is an enlarged, partial fragmentary, cross-sectional, plan view taken along line 7—7 in FIG. 5 showing the construction of an uplift control mechanism.

The uplift control 65 is shown in greater detail in the cross-section of FIG. 7. The uplift control includes two generally rigid channel members 67,67 positioned and secured around the suspension means 54. The two generally rigid channel members 67,67 are cut to a length generally equal to the suspension means 56. As shown in FIG. 7, the channel members 67,67 are generally C-shaped members which are positioned to mate forming a tube-like cavity around the suspension means 56. The channels 67,67 are retained in this position by a wire tie 68 which is tightly wrapped around the outside surface of the channel members 67.

The ceiling construction 48 as shown in FIG. 5 also includes an interlocking edge expansion joint 70 and an intermediate frame expansion joint 72. These expansion joints 70,72 provide structural support while accommodating the expansion and the contraction of the materials employed in the security barrier system 29. In this regard, as the planar expanse of plaster material 35 attached to the security lath assembly 20 expands and contracts, the expandable edge joints 70 and frame expansion joints 72 allow for movement relative to generally fixed structures to reduce or minimize cracking or other material stresses. As noted hereinabove, the surface coating 62 provides an additional benefit to prevent the formation or propagation of cracks in the plaster material.

Figure 8:
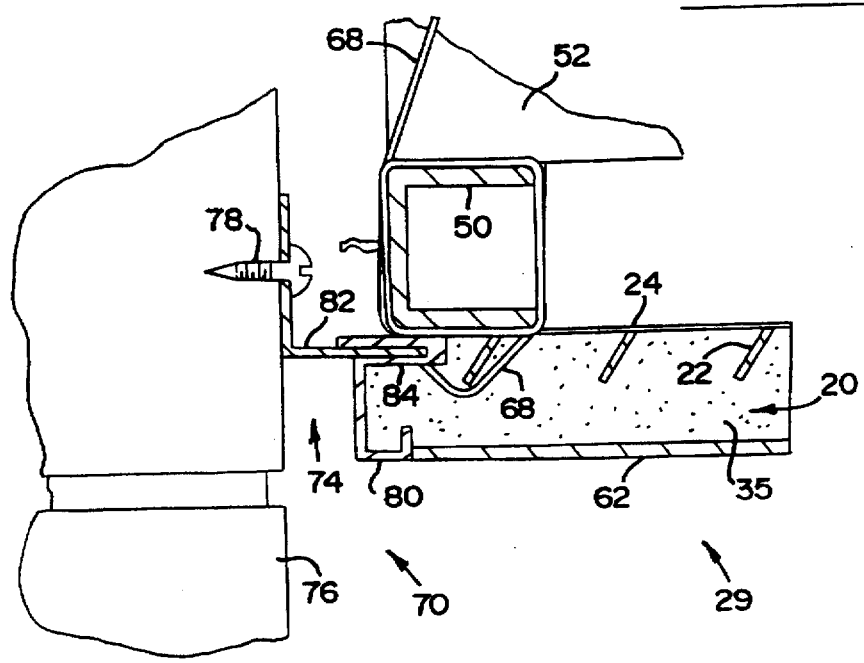
FIG. 8 is an enlarged, partial fragmentary, cross-sectional view of an edge expansion assembly as shown in FIG. 5.

As shown in FIG. 8, the edge expansion joint 70 includes an anchor bracket 74 which is secured to a wall structure 76 by way of an appropriate fastener 78. A mating screed portion 80 mates with an extending portion 82 of the anchor bracket 74. The screed 80 provides a guide edge for applying an appropriate thickness of plaster 35 and coating 62 in the construction of the security barrier system. A channel portion 84 mates with the extending portion 82 of the anchor 74 to allow for a degree of horizontal movement upon the expansion or contraction of the security barrier system 29.

As also shown in FIG. 8, the channel portions 50 are wire tied 68 to the cross members 52. This flexible attachment accommodates the expansion and contraction of the materials. Further, a wire tie 68 is also employed to attach the security lath assembly 20 to the frame means 34. As shown in FIGS. 1–3, apertures 37 are provided in the backing material 24 to allow wire ties to be threaded through the backing material 24, through the mesh material 22 and attached to the frame means 34. By preforming the apertures 38 through the backing material 24, the craftsman installing the security lath assembly 20 does not need to tear or rip holes blindly through the backing material. This maintains the integrity of the system. The holes also allow the craftsman to see the frame structure 34 through the apertures during the installation of the security lath assembly 20. This helps the craftsman to accurately place the wire tie 68.

The frame expansion joint 72 shown in FIG. 5 includes two overlapping sections 86,88 of neighboring cross members 52. An expansion joint 44 as described hereinabove with regard to FIG. 4 is attached to two spaced apart channels 50. The channels 50,50 and attached expansion joint 44 are wire tied to the overlapping portions 86,88 of the cross members. As such, as the frame 34 and security barrier system 29 expand and contract, the cross members are allowed to move thereby minimizing the resistance to the expansion and contraction resulting in minimizing the material fatigue, in particular the stresses applied to the plaster material.

In use, the security lath assembly 20 of the present invention is constructed of the mesh material 22 which is attached to the backing material 24 by way of the adhesive 26. The backing material includes a coating 34 which helps control the rate of cure of the plaster material 35 applied to the mesh 24 in constructing the security barrier system 29. The adhesive 26 is applied to the face 36 of the mesh material 22 and allowed to extend or flow over the mesh material. The adhesive 26 contacts the coated surface 34 of the backing material 24 and forms a bond between the mesh material 22 and the backing material 24. Perforations or apertures 38 are provided in the backing material 24 to allow a craftsman to extend wire ties 68 through the apertures 38 and the cells 32 to attach the security lath assembly 20 to a frame 34.

The mesh material 22 used in the security lath assembly 20 is preferably a metal such as steel which is galvanized or coated with other means to prevent corrosion. The mesh material 22 is preferably formed from 16 gauge steel which has been expanded to have an open area from generally 60% to 90% resulting in a weight of generally 40–100 lbs. per 100 square feet. As shown in FIG. 2, the cells 32 of such material may have an opening measured longways from the center of one bond 30 to the center of the next bond 30 (as indicated by dimension arrow 90) or "LWD" (long way of diamond) of approximately ¾" and measured in the short direction from the center of one bond 30 to the center of the next bond 30 (as indicated by dimension arrow 92) or short way of diamond "SWD" of approximately ¼". The LWD and SWD may vary depending upon the type of material used and the thickness of the material used as well as the specific security requirements. Generally, it is preferable to produce the mesh material from a generally continuous sheet of 18–13 gauge material, generally steel, which is expanded to have an open area of generally 40%–90%, resulting in a weight of generally 20–175 lbs. per 100 square feet.

The panels of the security lath assembly 20 are employed in plaster structure constructions such as wall structures 40 (See FIG. 4) and ceiling structures 48 (See FIG. 5). These structures 40,48 include the security barrier system 29. The security barrier system 29 is formed by attaching the security lath assembly 20 to a frame 34 and applying a plaster material 35 over the mesh 22. The backing material limits the amount of plaster material which can be pressed through the mesh. The coating 34 helps control the rate of cure of the plaster material thereby producing a superior plaster surface.

Once the plaster material 35 has been finished to a desired surface depth and finish, the surface coating 62 is applied. The surface coating 62 has elastomeric qualities which allow it to expand and contract with the expansion and contraction of the plaster material 35 and metal mesh 22 without separating thereby preventing the formation and propagation of cracks in the plaster material.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A security barrier system, for use in plaster or stucco structures, said security barrier system facilitating production of a finished surface having an embedded security barrier, said security barrier system comprising:

a mesh material having a plurality of connected stakes defining cells therebetween, said mesh material being sized and configured for providing a lath surface to hold plaster or stucco material in a plaster or stucco structure and for providing a security barrier to prevent penetration through said structure;

a backing material attached to said mesh material, said backing material providing a boundary for limiting material movement through said cells of said mesh material and for affecting the rate of curing of the plaster material;

a plaster material applied to said mesh material for forming a plaster structure surface, said plaster material keying into said cells of said mesh material and contacting said backing material;

a surface coating applied over said plaster material for preventing the formation and propagation of cracks in said plaster material;

framing means from which said security barrier system is suspended for defining a ceiling structure;

a generally vertically oriented suspension means attached to said framing means and a spaced apart upper structure for supporting said ceiling structure; and uplift control means attached to said generally vertically oriented suspension means for preventing upward displacement of said ceiling structure, said uplift control means includes two rigid channel members positioned and secured around said suspension means, said two rigid channel members having a length dimension generally equal to said suspension means for providing rigid resistance to an upward force applied to said ceiling structure.

2. A security barrier system as recited in claim 1, said mesh material being formed from a generally continuous sheet material of from 18 to 13 gauge, which is expanded to have an open area of generally 40%–90%, resulting in a weight of generally 20–175 pounds per 100 square feet.

3. A security barrier system as recited in claim 1, said mesh material being formed from a generally continuous 18 gauge sheet material, which is expanded to have an open area of generally 45%–90%, resulting in a weight of generally 20–175 pounds per 100 square feet.

4. A security barrier system as recited in claim 1, said mesh material being formed from a generally continuous 16 gauge sheet material, which is expanded to have an open area of generally 60%–90%, resulting in a weight of generally 40–100 pounds per 100 square feet.

5. A security barrier system as recited in claim 1, surface coating comprising an elastomeric surface coating applied over an exposed surface of said plaster material for preventing the formation and propagation of cracks in said plaster material.

* * * * *